US005174185A

United States Patent [19]

Aichele

[11] Patent Number: 5,174,185

[45] Date of Patent: Dec. 29, 1992

[54] ROTARY CUTTING DEVICE FOR MATERIAL WEBS

[76] Inventor: Wilhelm Aichele, Mozartstrasse 12, 7180 Crailsheim, Fed. Rep. of Germany

[21] Appl. No.: 737,043

[22] Filed: Jul. 29, 1991

[51] Int. Cl.[5] ........................ B23D 75/12; B26D 1/56

[52] U.S. Cl. ........................................ 83/346; 83/348; 83/673

[58] Field of Search ................. 83/344, 346, 347, 348, 83/673

[56] References Cited

U.S. PATENT DOCUMENTS

| | | | |
|---|---|---|---|
| 4,095,498 | 6/1978 | Biggar, III | 83/346 |
| 4,455,903 | 6/1984 | Kesten | 83/346 |
| 4,553,461 | 11/1985 | Belongia | 83/344 |
| 4,759,247 | 7/1988 | Bell et al. | 83/346 |
| 4,770,078 | 9/1988 | Gautier | 83/344 |

FOREIGN PATENT DOCUMENTS

| | | |
|---|---|---|
| 2444704 | 4/1976 | Fed. Rep. of Germany . |
| 2917937 | 11/1980 | Fed. Rep. of Germany . |
| 2134432 | 8/1984 | United Kingdom . |

*Primary Examiner*—Hien H. Phan

*Attorney, Agent, or Firm*—Shenier & O'Connor

[57] ABSTRACT

A rotary cutting device for material webs consists of a machine frame with rollers supported in pivot bearings on the machine frame, driven by rotary drives and defining a cutting range, namely a cutting roller and a counter cutting roller, which form a roller gap for feeding the web material between them within the cutting range. The cutting and counter cutting rollers are supported so as to roll directly one over the other using spacing rings located outside the cutting range. At least one of these rollers engages at least one adjustable pressure roller link bar between the spacing rings so that the link bar presses one roller against the other roller with an adjustable force.

3 Claims, 2 Drawing Sheets

ROTARY CUTTING DEVICE FOR MATERIAL WEBS

The invention relates to a rotary cutting device for material webs as described in the preamble of patent claim 1.

Such a device is known from U.S. Pat. No. 47 59 247. With the known device it will also be possible to adjust the gap between the rollers by an axial shift of the counter roller, however, not possible during the cutting process, as it will not be possible to achieve any precision cutting edges of the material web to be cut by shifting the counter roller in the axial direction. The adjustable support rollers, which are also provided in the known device, do not engage on the rollers themselves but on support rings fitted to them so that it will not be possible to adjust the gap between the rollers in the cutting range by this method either.

GB-OS 21 34 432 shows a rotary cutting device with spacing rings on one roller only. It is evident from DE-AS24 44 704 and DE-AS 29 17 937 that there are support rollers which also support a cutting roller on its side facing away from a counter roller. However, these support rollers cannot be adjusted.

The object of the invention is to improve a device of the type described in a simple manner in such a way that the distance between the rollers can be permanently readjusted taking into consideration the wear in the cutting edge during the cutting process while maintaining maximum precision and achieving longer tool lives for its rollers.

The problem is solved according to the invention by the features in the characterizing section of claim 1.

This will achieve the advantage of being able to permanently compensate for any wear in the cutting tool while the web is being cut. As the rollers will be adjusted at right angles to the cut, this adjustment will not affect the cut executed, and will always produce sharp cutting edges irrespective of any adjustment in one or both those rollers, so that it will, nevertheless, be possible to compensate for any wear in the cutting tool.

The object of subsidiary claims 2 and 3 are preferred forms of the design according to the invention.

Figure 1:
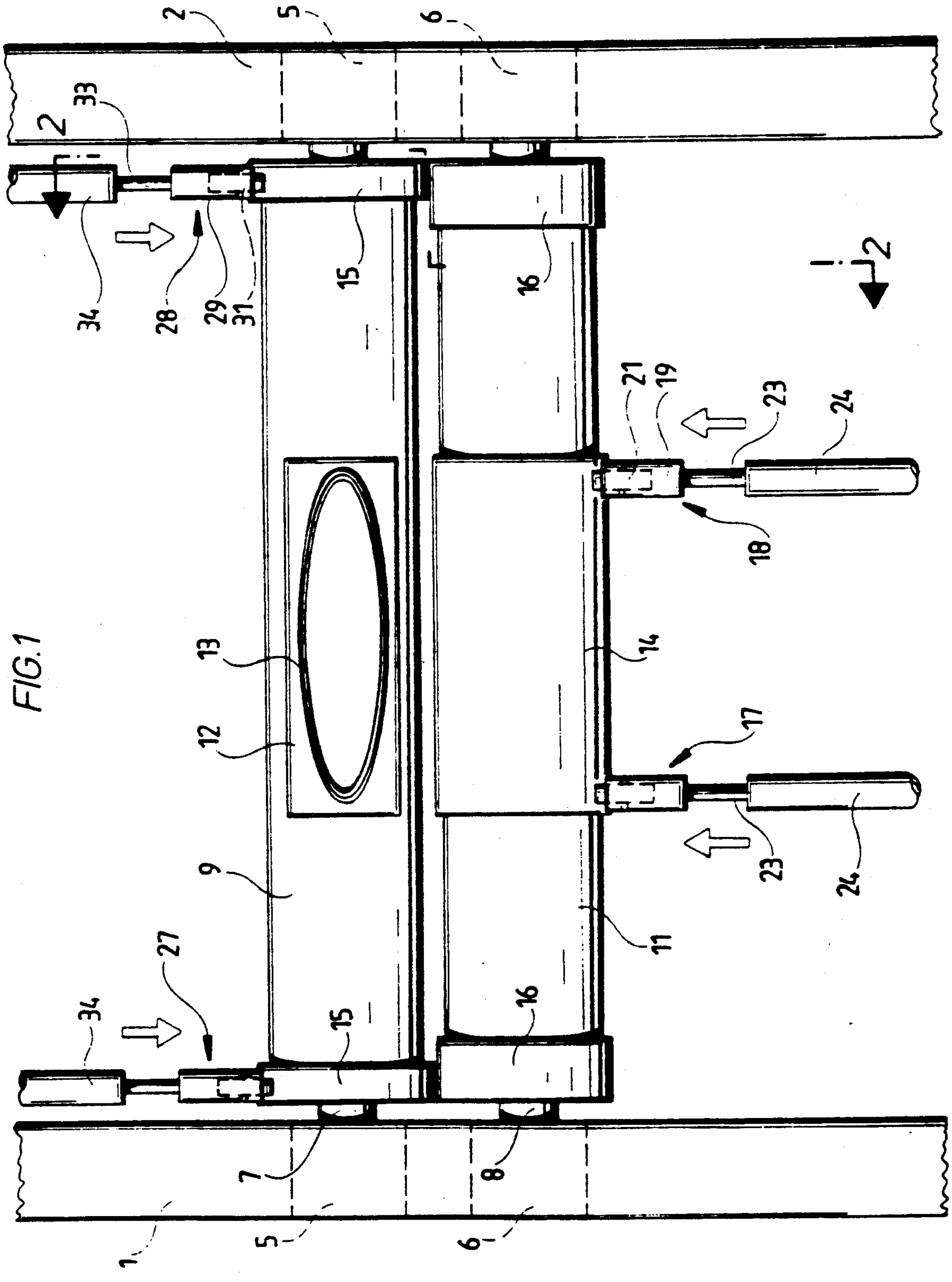
Figure 2:
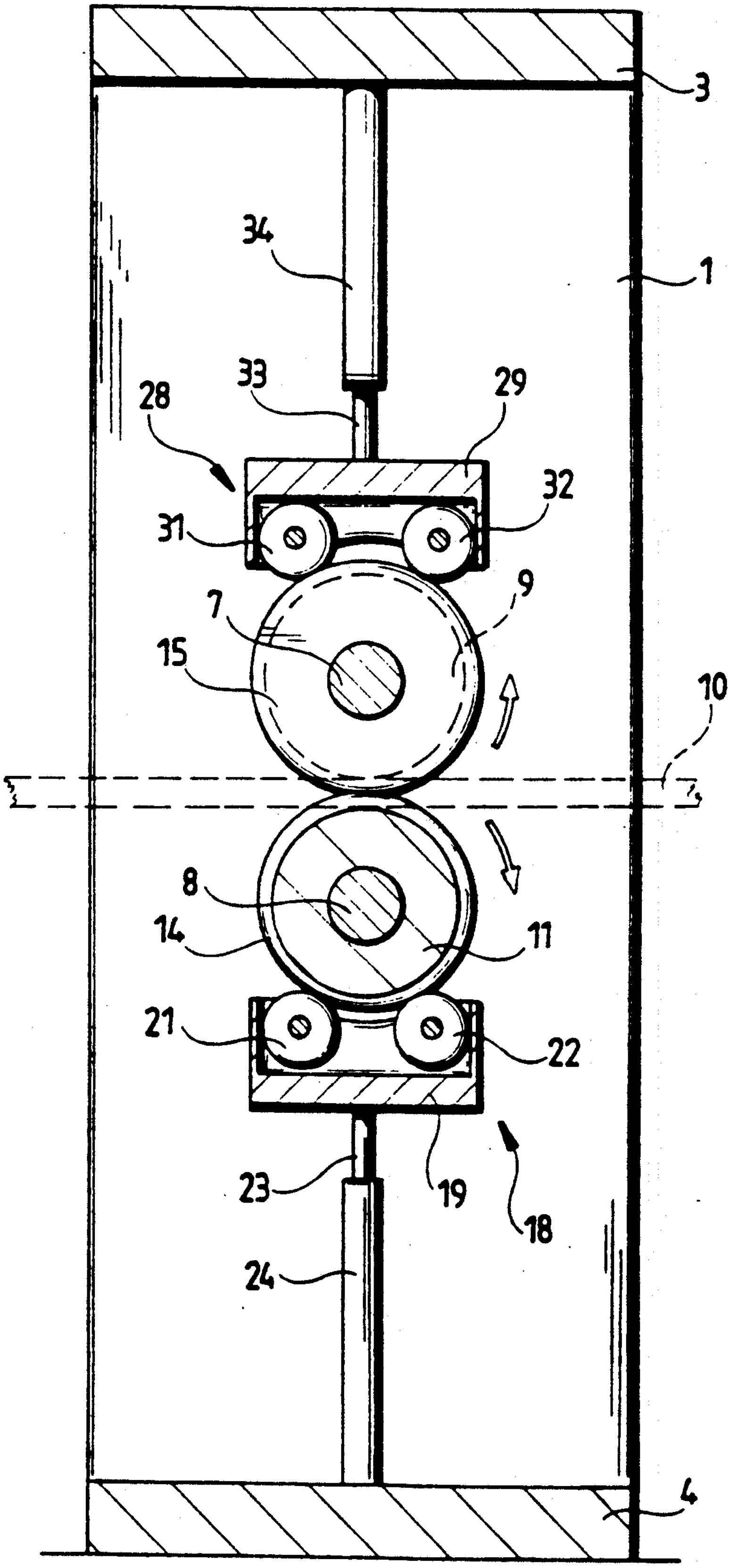

The description below of a preferred form of the design of the invention together with the accompanying drawing are intended for further explanation. Where:

FIG. 1 shows the front view of a rotary cutting device for material webs schematically and FIG. 2 shows a sectional view of the device as in FIG. 1 along the line 2—2 schematically.

The rotary cutting device shown in the drawing for material webs, such as for example paper, textile, fiber strands, plastic foils, metallic foils and webs of other materials, consist essentially of a machine frame formed by two vertical uprights 1, 2. The two uprights 1, 2 are joined together via horizontal beams 3, 4 (FIG. 2) and are rigidly anchored to the floor. The shafts 7, 8 of two rollers, namely a cutting roller 9 and a counter cutting roller 11, are mounted so that they can rotate between the uprights 1, 2 of the machine frame in pivot bearings 5, 6 in the conventional manner. The two rollers are driven in counter rotation in the directions shown by the arrows (FIG. 2) via conventional motor and gear mechanism (not shown).

The cutting roller 9 is fitted with one or several cutting plates 12, the curvature of which matches the curvature of the roller 9. A sharp cutting edge 13 is formed on each cutting plate, for example, in the form of a closed oval curve, so that it will be possible to "stamp out" corresponding oval patterns out of the web 10 as is shown in FIG. 2.

The cutting plate or plates 12 with the cutting edge 13 faces a mainly ringshaped and smooth counter plate 14, also referred to as "ring" or "counter cutting shell", which is attached to the counter roller 11. Cutting and counter plates 12 or 14 rotate together with the rollers 9, 11 and define a cutting range extending over a section of the axial length of the roller. A gap between the rollers adapted to the thickness of the web for the free passage of that web is maintained between the rollers, particularly between the cutting range as well.

The cutting plate 12 with the cutting edge 13 and counter plate 14 consist of hard wear resistant material such as, for example, hard metal, zirconium oxide or aluminum oxide ceramic.

The spacing rings 15 or 16 are rigidly attached to both front ends of the cutting roller 9 and the counter cutting roller 11, hence outside the cutting range as defined by the plates 12, 14, which roll directly one over the other, so that the two rollers 9, 11 are supported one on top of the other as a result. The spacing rings 15, 16 will preferably also consist of hard wear resistant material.

There are two pressure roller link bars 17, 18 which engage in the counter plate 14 from the bottom in the area between the spacing rings 16, which, as is shown in FIG. 2, consist of a frame 19 supporting two rollers 21, 22 that can rotate freely, which are up against the edge section of the counter plate 14 rigidly joined to the counter cutting roller. The frame 19 of the two pressure roller link bars is rigidly connected to the end of the piston rod 23 of a pressure medium cylinder 24, preferably a pneumatic cylinder, so that the pressure roller link bar will press the counter cutting roller 11 towards the cutting roller 9 with an adjustable force when the cylinder 24 is actuated accordingly.

The distance between the cutting plate 12 and the cutting edge 13 on the one hand and the counter cutting plate 14 on the other hand can be accurately adjusted by means of the spacing rings 15, 16 and the pressure roller link bars 17, 18 and can be kept permanently constant while the web is being cut. It will also be possible to adjust the counter plate 14 subsequently by means of the cylinder 24, if necessary, when the cutting edge 13 is worn.

It was found that the pivot bearings 5, 6 could be used in this way with considerably less precision and stability than in the case of the known devices of the type described. It would also cease to be a matter of maintaining an accurate temperature constancy of the rollers 9, 11 or the cutting plate 12 and counter plate 14, as it will be possible to set optimum cutting conditions in a simple manner exclusively via the pressure roller link bars 17, 18 which can be adjusted by the cylinder 24. The precision of the cutting process will be retained. Longer tool lives of the cutting edge 13 will be achieved at the same time.

In the form of the design shown, there are two adjustable pressure roller link bars 17, 18, which engage the counter cutting roller 11. In principle, it will also be possible to use only one such pressure roller link bars, if the geometry and the design of the device and in particular the width of the web to be processed will allow. The working cylinders 24 could in principle also be displaced by threaded spindles or similar guide bars.

As is shown in FIG. 2, it will also be possible to provide two other pressure roller link bars 27, 28 above the cutting roller 9, where the rollers 31, 32, which are mounted to rotate freely in the frame 29 are up against the spacing rings 15 of the cutting roller 9. The frame 29 is again rigidly joined to the end of the piston rod 33 of the pressure medium cylinder 34, preferably a pneumatic cylinder, so that a predetermined force is exercised on the spacing rings 15 via the rollers 31, 32 and consequently these rings are pressed against the spacing rings 16 of the counter cutting roller 11 with a predetermined force. It was found that the pivot bearings 5, 6 of the rollers 9, 11 would also require less precision and stability as a result of this measure. The pivot bearings 5 can be shifted in the uprights 1, 2, preferably relative to the pivot bearing 6, when the pressure roller link bars 27, 28 engage on the spacing rings 15.

In the form of this design shown, the pressure roller link bars 17, 18 intended to adjust the gap between the rollers in the cutting range will engage the counter cutting roller 11, whereas the other pressure roller link bars 27, 28 will engage the spacing rings 15 of the cutting roller 9. It would also be possible to arrange the pressure roller link bars 17, 18 or 27, 28 in the reverse manner, i.e. the pressure roller link bars 17, 18 could engage the cutting roller 9 and the pressure roller link bars 34 could engage the spacing rings 16 of the counter cutting roller 11.

I claim:

1. A rotary cutting device for material webs including a machine frame and two rollers, namely a cutting roller and a counter cutting roller, mounted on pivot bearings on the machine frame and being provided with rotary drives, the cutting roller being fitted with at least one curved cutting plate having a sharp cutting edge, the counter cutting roller being fitted with a curved counter plate, the cutting and counter plates defining a cutting range extending between two ends over only a section of the axial length of said rollers, said cutting range being situated substantially in the middle of the cutting and counter cutting rollers, a gap being maintained between the cutting and counter plates for the free passage of the material webs to be cut, said cutting and counter cutting rollers being supported on spacing rings located outside the cutting range so as to be able to roll one directly over the other, wherein the improvement comprises an adjustable pressure roller link bar engaging at least one of said rollers adjacent to each of the two ends of the cutting range between the spacing rings, said pressure roller link bars pressing said at least one roller within the cutting range against the other roller with an adjustable force to adjust the distance between the rollers in the cutting range and to compensate wear of the cutting edge while the material webs are being cut.

2. A device as in claim 1 wherein the improvement further comprises a pneumatic cylinder for adjusting the pressure of said roller link bars.

3. A device as in claim 1 in which the improvement further comprises additional pressure roller link bars for pressing said spacing rings against each other.

* * * * *